United States Patent
Hasegawa et al.

(10) Patent No.: US 12,463,443 B2
(45) Date of Patent: Nov. 4, 2025

(54) CONTROL DEVICE, CONTROL METHOD, AND NON-TRANSITORY RECORDING MEDIUM

(71) Applicant: CASIO COMPUTER CO., LTD., Tokyo (JP)

(72) Inventors: Hirokazu Hasegawa, Koganei (JP); Atsushi Shibutani, Tokorozawa (JP); Wataru Nimura, Hamura (JP); Masahiko Kodama, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 141 days.

(21) Appl. No.: 18/113,109

(22) Filed: Feb. 23, 2023

(65) Prior Publication Data

US 2023/0305569 A1  Sep. 28, 2023

(30) Foreign Application Priority Data

Mar. 22, 2022 (JP) ................. 2022-045986

(51) Int. Cl.
*H02J 7/00* (2006.01)
*H02J 50/00* (2016.01)
*G06N 3/008* (2023.01)

(52) U.S. Cl.
CPC .......... *H02J 7/0063* (2013.01); *H02J 7/0048* (2020.01); *H02J 7/0068* (2013.01);
(Continued)

(58) Field of Classification Search
CPC ..... G05D 1/0217; Y02E 60/10; H02J 7/0048; H02J 7/00716; H02J 7/0068; G06N 3/008; B60W 20/13; B60L 58/14
See application file for complete search history.

(56) References Cited

U.S. PATENT DOCUMENTS 11,579,617 B2  2/2023 Hayashi
11,809,192 B2  11/2023 Hayashi
(Continued)

FOREIGN PATENT DOCUMENTS

GB  2566881 A  3/2019
JP  2003071772 A  3/2003
(Continued)

OTHER PUBLICATIONS

Japanese Office Action (and an English language translation thereof) dated Feb. 20, 2024, issued in counterpart Japanese Application No. 2022-045986.

(Continued)

*Primary Examiner* — Dale Moyer
(74) *Attorney, Agent, or Firm* — Holtz, Holtz & Volek PC

(57) ABSTRACT

A control device includes a processor. The processor controls an electric power supply to an operating part, and charging and discharging of a secondary battery; estimates electric power being supplied to the operating part and the secondary battery; acquires a charge state for a case of charging the secondary battery; and when a determination is made that the electric power estimated by the processor and being supplied to the operating part and the secondary battery is less than electric power required for a predetermined action to be executed by the operating part and, also, the charge state of the secondary battery is a predetermined charge state, controls so as to limit the predetermined action.

15 Claims, 7 Drawing Sheets

(52) U.S. Cl.
CPC ........ *H02J 7/00712* (2020.01); *H02J 50/005* (2020.01); *G06N 3/008* (2013.01); *Y02E 60/10* (2013.01)

(56) References Cited

U.S. PATENT DOCUMENTS

| | | | |
|---|---|---|---|
| 2002/0007230 A1 | 1/2002 | Jeno et al. | |
| 2010/0085057 A1* | 4/2010 | Nishi | H01M 10/44 324/427 |
| 2010/0102630 A1* | 4/2010 | Turski | H02J 7/0032 307/10.7 |
| 2011/0316486 A1* | 12/2011 | Inaba | H01M 10/48 320/150 |
| 2016/0229302 A1* | 8/2016 | Lee | H02J 7/1423 |
| 2018/0301922 A1* | 10/2018 | Battle | G06F 1/263 |
| 2019/0138019 A1 | 5/2019 | Hayashi | |
| 2019/0299806 A1* | 10/2019 | Oyama | H01M 10/425 |
| 2019/0299809 A1* | 10/2019 | Oyama | H02J 7/00302 |
| 2023/0168682 A1 | 6/2023 | Hayashi | |
| 2023/0253795 A1* | 8/2023 | Morishima | H02J 7/00712 320/104 |

FOREIGN PATENT DOCUMENTS

| | | |
|---|---|---|
| JP | 2012244792 A | 12/2012 |
| JP | 2018133878 A | 8/2018 |
| JP | 2019107461 A | 7/2019 |

OTHER PUBLICATIONS

Extended European Search Report (EESR) dated Oct. 6, 2023, issued in counterpart European Application No. 23157418.7.
Japanese Office Action (and an English language translation thereof) dated Sep. 16, 2025, issued in counterpart Japanese Application No. 2024-107292.

* cited by examiner

CCCV CHARGING METHOD

CONTROL DEVICE, CONTROL METHOD, AND NON-TRANSITORY RECORDING MEDIUM

CROSS-REFERENCE TO RELATED APPLICATION

This application claims the benefit of Japanese Patent Application No. 2022-045986, filed on Mar. 22, 2022, the entire disclosure of which is incorporated by reference herein.

FIELD

The present disclosure relates to a control device, a control method, and a non-transitory recording medium.

BACKGROUND

Small electronic devices driven by rechargeable secondary batteries are frequently used.

For example, a robot that is capable of expressing a sense of lifelikeness by having an appearance of and/or moving like a living thing has been developed as such a small electronic device. For example, pet-type robots have been developed that are capable of expressing a sense of lifelikeness by using motors to drive legs to walk, wag a tail, and the like. For example, Japanese Unexamined Patent Application No. 2003-71772 discloses building a secondary battery and a power receiving induction coil into a pet-type robot provided with an electromagnetic induction charging function, providing an external charger with a power transmitting induction coil, and carrying out emotion expressions such as actions and emotions of a virtual pet by performing an action of wagging a tail, moving the head up and down as though eating food, and the like, even while charging the secondary battery.

SUMMARY

A control device according to the present disclosure includes a processor, wherein
the processor
controls an electric power supply to an operating part, and charging and discharging of a secondary battery;
estimates electric power being supplied to the operating part and the secondary battery;
acquires a charge state for a case of charging the secondary battery; and
when a determination is made that the electric power estimated by the electric power estimator and being supplied to the operating part and the secondary battery is less than electric power required for a predetermined action to be executed by the operating part and, also, the charge state of the secondary battery is a predetermined charge state, controls so as to limit the predetermined action.

BRIEF DESCRIPTION OF THE DRAWINGS

A more complete understanding of this application can be obtained when the following detailed description is considered in conjunction with the following drawings, in which.

DETAILED DESCRIPTION

Figure 1:
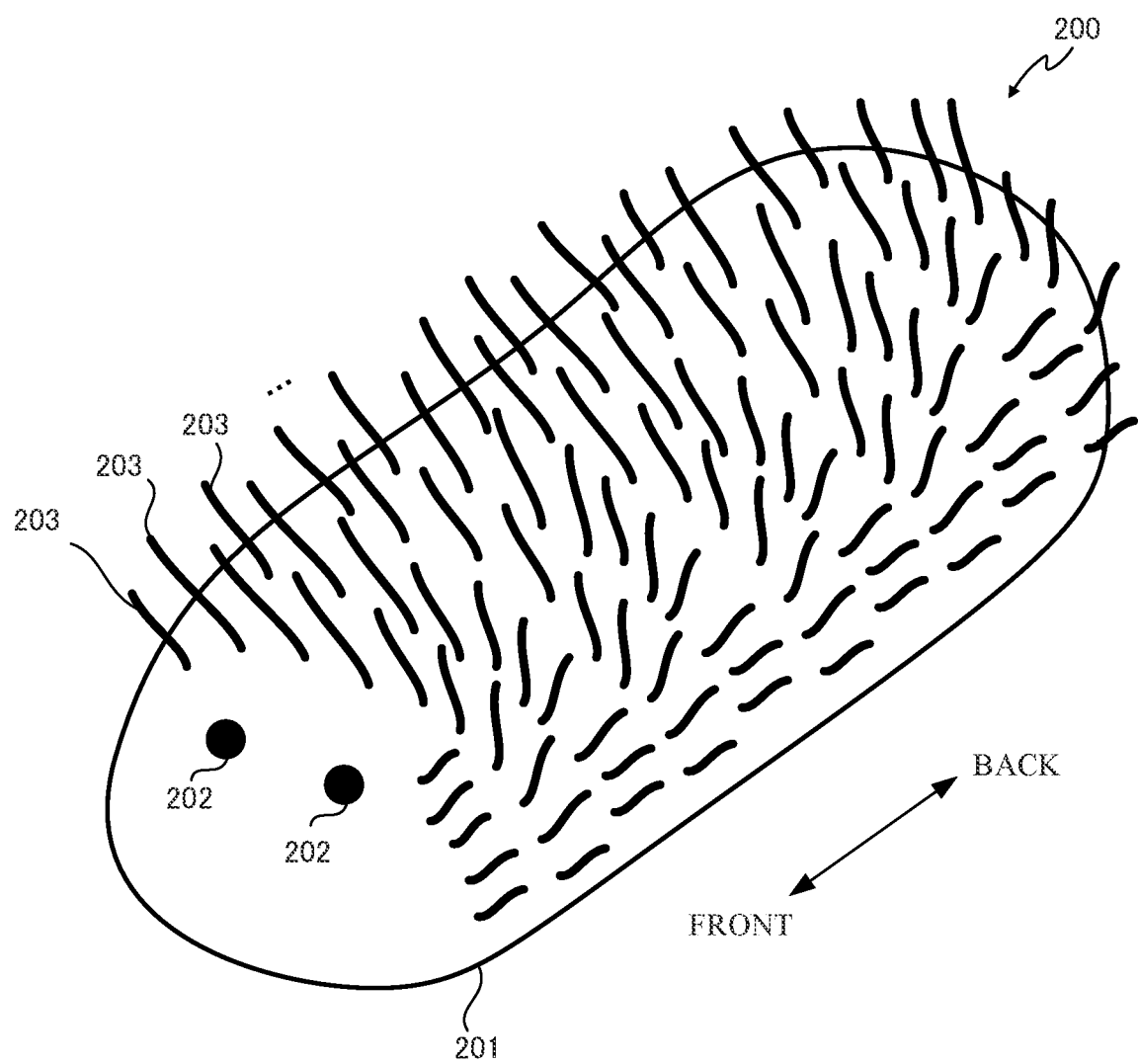
FIG. 1 is a drawing illustrating the appearance of a robot according to an embodiment of the present disclosure.

Hereinafter, embodiments of the present disclosure are described while referencing the drawings. Note that, in the drawings, identical or corresponding components are denoted with the same reference numerals.

Embodiments

An embodiment in which a control device of an apparatus of the present disclosure is applied to a robot 200 illustrated in FIG. 1 is described while referencing the drawings. The robot 200 according to the embodiment is a pet-type robot that is driven by a rechargeable secondary battery and resembles a small animal. As illustrated in FIG. 1, the robot 200 is covered with an exterior 201 provided with bushy fur 203 and decorative parts 202 resembling eyes. A housing 207 of the robot 200 is accommodated in the exterior 201.

Figure 2:
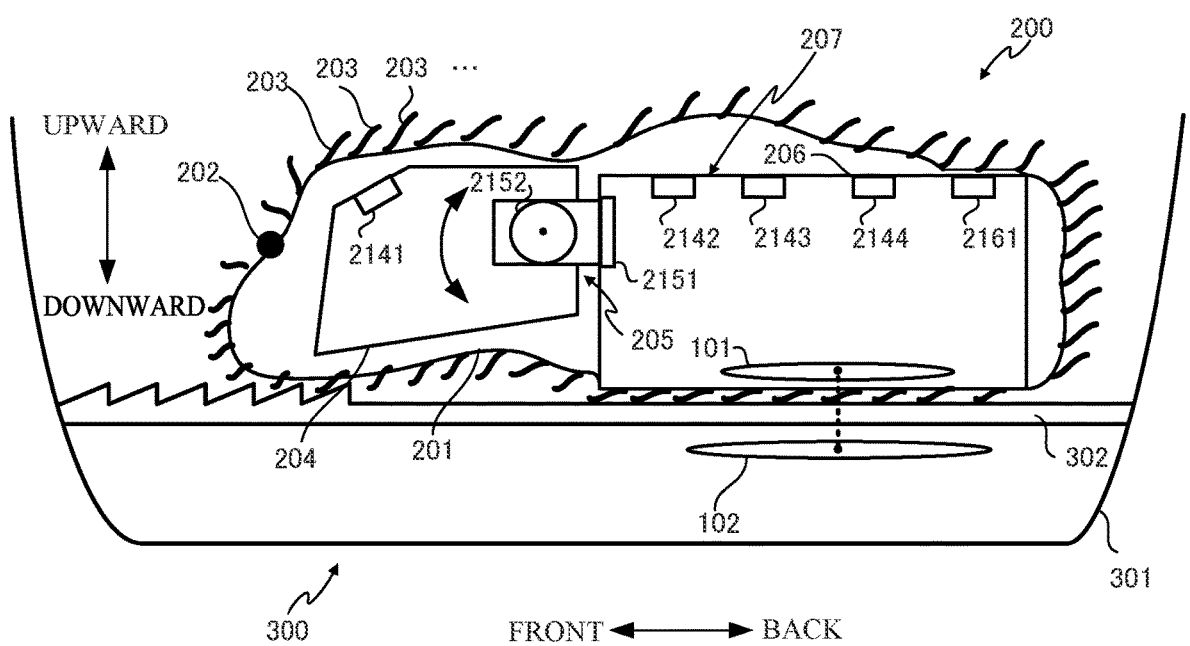
FIG. 2 is a cross-sectional view illustrating, from a side surface, a state in which the robot according to the embodiment of the present disclosure is placed on a charging device.

FIG. 2 is a cross-sectional view illustrating, from a side surface, a state in which the robot 200 according to the embodiment of the present disclosure is placed on a charging device 300. Specifically, FIG. 2 illustrates a state in which the robot 200 is placed at a suitable position of the charging device 300. Note that the robot 200 and the charging device 300 are collectively referred to as the charging system of the robot 200.

As illustrated in FIG. 2, the housing 207 of the robot 200 includes a head 204, a coupler 205, and a torso 206. The head 204 and the torso 206 are coupled by the coupler 205. The torso 206 extends in a front-back direction, and contacts, via the exterior 201, a placement surface such as a floor, a table, or the like on which the robot 200 is placed. A twist motor 2151 is provided at a front end of the torso 206, and the head 204 is coupled to the front end of the torso 206 via the coupler 205. The coupler 205 is provided with a vertical motor 2152. Note that the twist motor 2151 may be provided on the coupler 205 or on the head 204.

The coupler 205 couples the torso 206 and the head 204 so as to enable rotation (by the twist motor 2151) around a first rotational axis that passes through the coupler 205 and extends in a front-back direction of the torso 206. The twist motor 2151 rotates the head 204, with respect to the torso 206, clockwise (right rotation) within a forward rotation angle range around the first rotational axis (forward rotation), counter-clockwise (left rotation) within a reverse rotation angle range around the first rotational axis (reverse rotation), and the like.

The coupler 205 couples the torso 206 and the head 204 so as to enable rotation (by the vertical motor 2152) around a second rotational axis that passes through the coupler 205 and extends in a width direction of the torso 206. The vertical motor 2152 rotates the head 204 upward (forward rotation) within a forward rotation angle range around the second rotational axis, downward (reverse rotation) within a reverse rotation angle range around the second rotational axis, and the like.

The robot 200 includes a touch sensor 2141 on the head 204. The touch sensor 2141 can detect petting or striking of the robot 200 by a user. Additionally, the touch sensor 2141 is provided on each of a front and back of a left-side surface and a front and back of a right-side surface of the torso 206 (not illustrated), and can detect petting or striking of the torso 206 by the user.

The robot 200 includes an acceleration sensor 2142 on the torso 206. The acceleration sensor 2142 can detect an attitude (orientation) of the robot 200, and can detect being picked up, the orientation being changed, being thrown, and the like by the user. The robot 200 includes a gyrosensor 2143 on the torso 206. The gyrosensor 2143 can detect vibrating, rotating, and the like of the robot 200. When an external stimulus is detected by the touch sensor 2141 or the like, the robot 200 performs a movement corresponding to the external stimulus by actuating the motors, and expresses an action as a virtual pet.

The robot 200 includes a microphone 2144 on the torso 206. The microphone 2144 can detect external sounds. Furthermore, the robot 200 includes a speaker 2161 on the torso 206. The speaker 2161 can be used to emit animal sounds, sing songs, and the like.

A power receiving coil 101 is provided on the torso 206. In one example, the power receiving coil 101 is a planar coil wound in a spiral shape, and is disposed such that a coil surface thereof is parallel to a floor surface 302 of the charging device 300. The power receiving coil 101 receives electric power by magnetic field coupling, such as electromagnetic induction, with a power transmission coil 102 provided in the charging device 300. Due to this configuration, electric power can be supplied in a non-contact manner from the charging device 300 to the secondary battery of the robot 200. Note that the electric power charged to the secondary battery serves as the driving power of the twist motor 2151 and the vertical motor 2152.

The charging device 300 has a box-like appearance resembling a nest of the robot 200, and includes an outer frame 301, and a floor surface 302 that has an elliptical shape.

The outer frame 301 is constituted from an insulating member such as plastic, for example. The floor surface 302 is a surface on which the torso 206 of the robot 200 is placed, and is configured such that, when the robot 200 is placed on the floor surface 302, the floor surface 302 is parallel to the power receiving coil 101 provided to the torso 206.

The power transmission coil 102 is provided below the floor surface 302 and inside the charging device 300. In one example, the power transmission coil 102 is a planar coil wound in a spiral shape, and is disposed such that a coil surface thereof is parallel to the floor surface 302. Specifically, the power transmission coil 102 is disposed so as to parallelly oppose the power receiving coil 101. Thus, the charging device 300 is provided with a configuration for transmitting electric power in a non-contact manner, and that includes the power transmission coil 102. In this embodiment, an AC adapter is provided outside or inside the charging device 300 and is connected to a household outlet.

This AC adapter converts supplied DC voltage to AC, and transfers electric power using the power transmission coil 102. Moreover, the power receiving coil 101 provided to the robot 200 receives the electric power by magnetic field coupling such as electromagnetic induction, and charges the secondary battery. As a result, electric power is supplied in a non-contact manner from the charging device 300 to the secondary battery of the robot 200. The robot 200 periodically performs a breathing action as a spontaneous action even when an external stimulus is not detected by the touch sensor or the like, and performs the breathing action and expresses a sense of lifelikeness while the secondary battery is being charged by the charging device 300.

Figure 3:
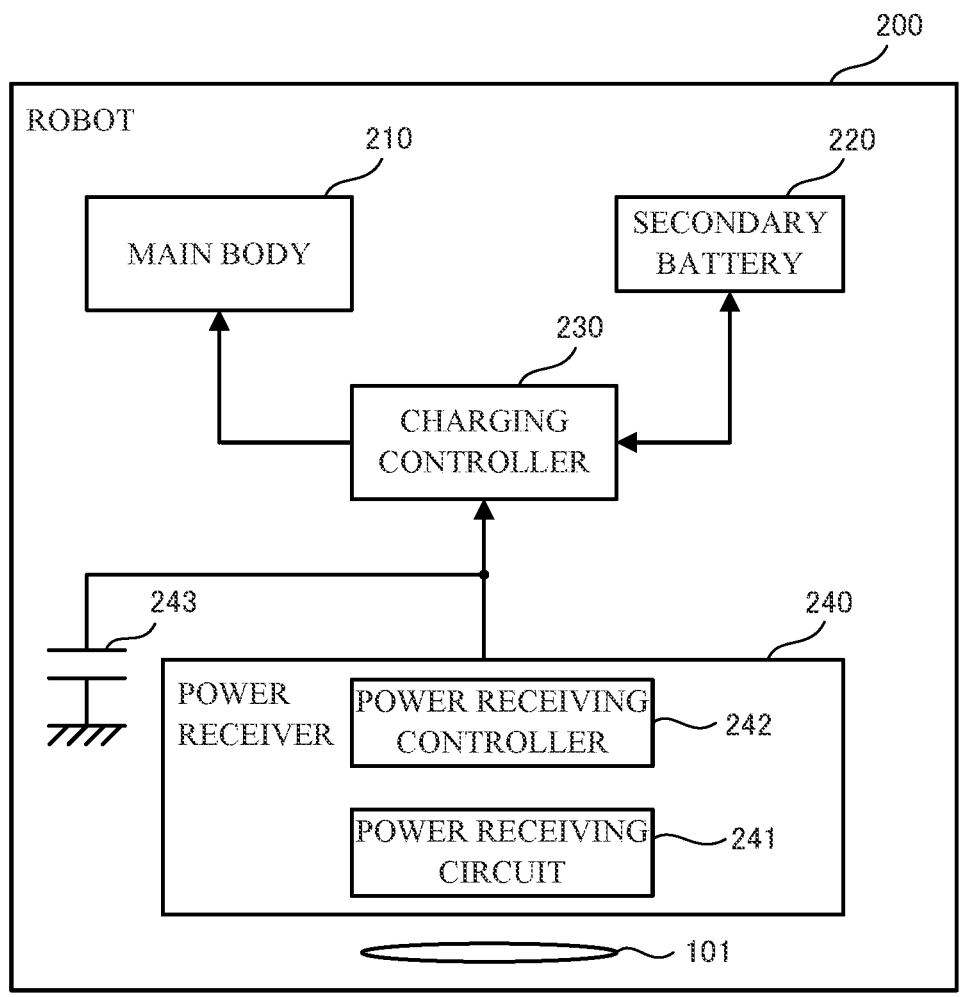
FIG. 3 is a block diagram illustrating the functional configurations of the robot and the charging device according to the embodiment of the present disclosure.
Figure 3:
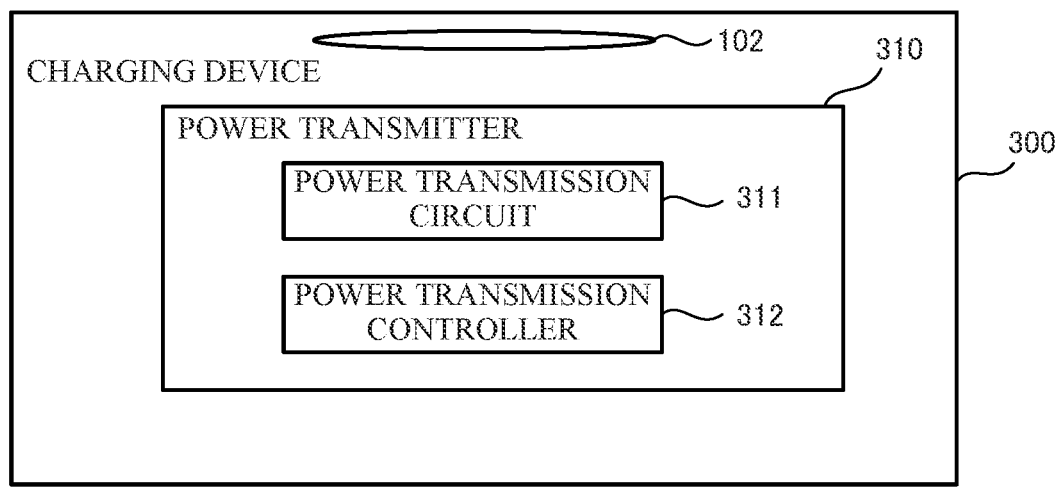

Next, the functional configurations of the robot 200 and the charging device 300 are described. As illustrated in FIG. 3, the robot 200 includes a main body 210, a secondary battery 220, a charging controller 230, a power receiver 240, and the power receiving coil 101. The charging device 300 includes the power transmission coil 102, and a power transmitter 310.

The main body 210 includes a controller that controls the actions of the entire robot 200, a driver that drives a movable part for expressing movements of the robot 200, and the like. The main body 210 is described in detail later.

The secondary battery 220 is implemented as a rechargeable battery such as a lithium ion battery or the like. This secondary battery 220 is a power supply battery that supplies driving power to the various load components of the robot 200. The supply of electric power is received from the charging device 300 through the power receiving coil 101, the power receiver 240, and the charging controller 230, and charging of the secondary battery 220 is performed.

The power receiver 240 controls processing for receiving the electric power from the charging device 300. The power receiver 240 includes a power receiving circuit 241 and a power receiving controller 242, and outputs the received electric power to the charging controller 230. The power receiving circuit 241 is a circuit that transmits, via the power receiving coil 101, data and the electric power to a power transmission circuit 311 of the charging device 300. The power receiving controller 242 is constituted by a power receiving control microcomputer, and controls the power receiving circuit 241. The power receiving controller 242 reads a control program from a memory or the like and executes the program to realize charging processing of the robot 200. Specifically, the power receiving controller 242 measures the current of the load, calculates the necessary electric power, and notifies the power transmitter 310 of the charging device 300. Additionally, the power receiving controller 242 outputs, to the main body 210, a signal indicating whether the electric power is received. A smoothing capacitor 243 is connected to the output of the power receiver 240 to absorb load fluctuation. However, a large-capacity capacitor is needed to absorb all of the expected load fluctuation, which leads to a corresponding increase in size, and securing space for accommodating this capacitor in the robot is difficult. Accordingly, the smoothing capacitor 243 has a capacity that corresponds to load fluctuation within a set range.

The power receiving coil 101 carries out, with the power transmission coil 102 of the charging device 300, exchanging of data and receiving of the electric power for charging.

The charging controller 230 carries out control of a charging operation to the secondary battery 220. Specifically, the charging controller 230 charges the secondary battery 220 by supplying, to the secondary battery 220, the electric power supplied to the secondary battery 220 from the power receiver 240. Additionally, the charging controller 230 supplies the electric power to the main body 210. That is, the charging controller 230 includes at least two functions, namely, a function of charging the secondary battery 220 as described above, and a function of supplying the electric power to the main body 210. Additionally, the charging controller 230 is included in one integrated circuit (IC).

The charging controller 230 can carry out control for switching the supply source of the electric power to be supplied to the main body 210 between an external power supply and the secondary battery 220. When the robot 200 is not placed on the charging device 300 and the electric power is not being supplied from the external power supply via the power receiver 240, the charging controller 230 carries out control for switching the supply source of the electric power to be supplied to the main body 210 to the secondary battery 220, and the robot 200 operates using the secondary battery 220. In a state in which the robot 200 is placed on the charging device 300 and the electric power is being supplied from the external power supply via the power receiver 240, when the secondary battery 220 is not in a fully charged state, the charging controller 230 carries out control for supplying the electric power to both the main body 210 and the secondary battery 220 from the external power supply, and the robot 200 operates while the secondary battery 220 is being charged. In a state in which the robot 200 is placed on the charging device 300 and the electric power is being supplied from the external power supply via the power receiver 240, when the secondary battery 220 is in a fully charged state, the charging controller 230 carries out control for supplying the electric power to the main body 210 from the external power supply, and the robot 200 operates using the electric power of the external power supply. That is, the robot 200 operates by preferentially receiving the supply of electric power from the external power supply.

The charging controller 230 supplies the electric power from the power receiver 240 to the secondary battery 220, and charges the secondary battery 220 by a constant current constant voltage (CCCV) charging method.

Figure 4:
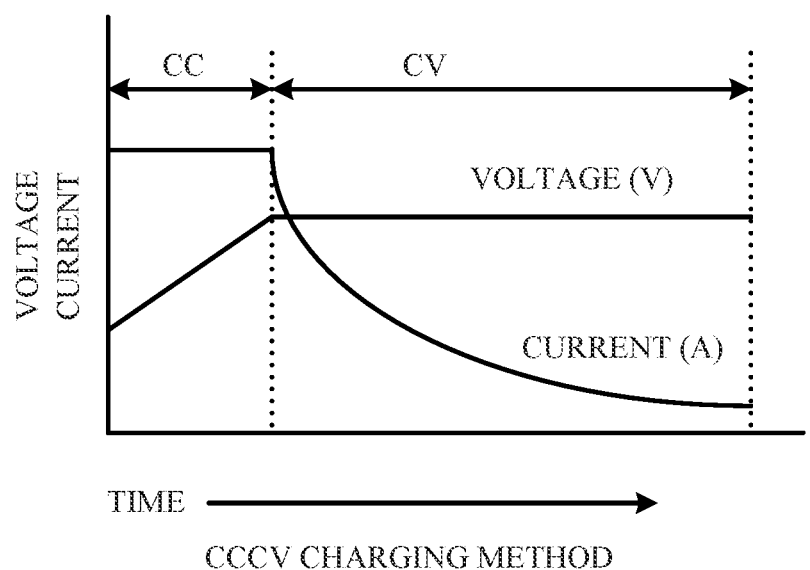
FIG. 4 is a drawing illustrating a charging current and a charging voltage when charging a secondary battery of the robot according to the embodiment of the present disclosure.

The charging controller 230 changes the charging current and/or the charging voltage (charging parameters) to be supplied from the power receiver 240, thereby controlling the charging so as to charge the secondary battery 220 by the CCCV charging method. As illustrated in FIG. 4, in the CCCV charging method, the charging controller 230 controls the charging such that the secondary battery 220 is charged at constant current by a constant current (CC) charging method until the output voltage of the secondary battery 220 reaches a predetermined switching voltage and, when the predetermined switching voltage is reached, the charging parameters (the charging current and/or the charging voltage) are changed, the charging method is switched to a constant voltage (CV) charging method, and the secondary battery 220 is charged at constant voltage. Moreover, when switching the charging method from the CC charging to the CV charging, the charging controller 230 sends, to the controller 211 of the main body 210, a CV charging switching notification that is a notification signal notifying that the charging parameters are changed. The charging controller 230 measures the voltage of the secondary battery 220 and sends the measured voltage to the controller 211 of the main body 210. When the charging current is less than or equal to a certain value, the charging controller 230 determines that the secondary battery 220 is fully charged and sends, to the controller 211 of the main body 210, a fully charged notification that is a notification signal notifying that the charging of the secondary battery 220 is completed.

The power transmitter 310 of the charging device 300 includes a power transmission circuit 311 and a power transmission controller 312, and transmits, to the robot 200 via the power transmission coil 102, the electric power necessary for the actions of the main body 210 of the robot 200 and for the charging of the secondary battery 220. The power transmission controller 312 is constituted from a power transmission control microcomputer, receives the notification of the necessary electric power from the power receiver 240, and controls the power transmission circuit 311 so as to transmit electric power corresponding to the necessary electric power. Qi, PMA, Rezence, or the like may be used as the wireless power supply standard.

Figure 5:
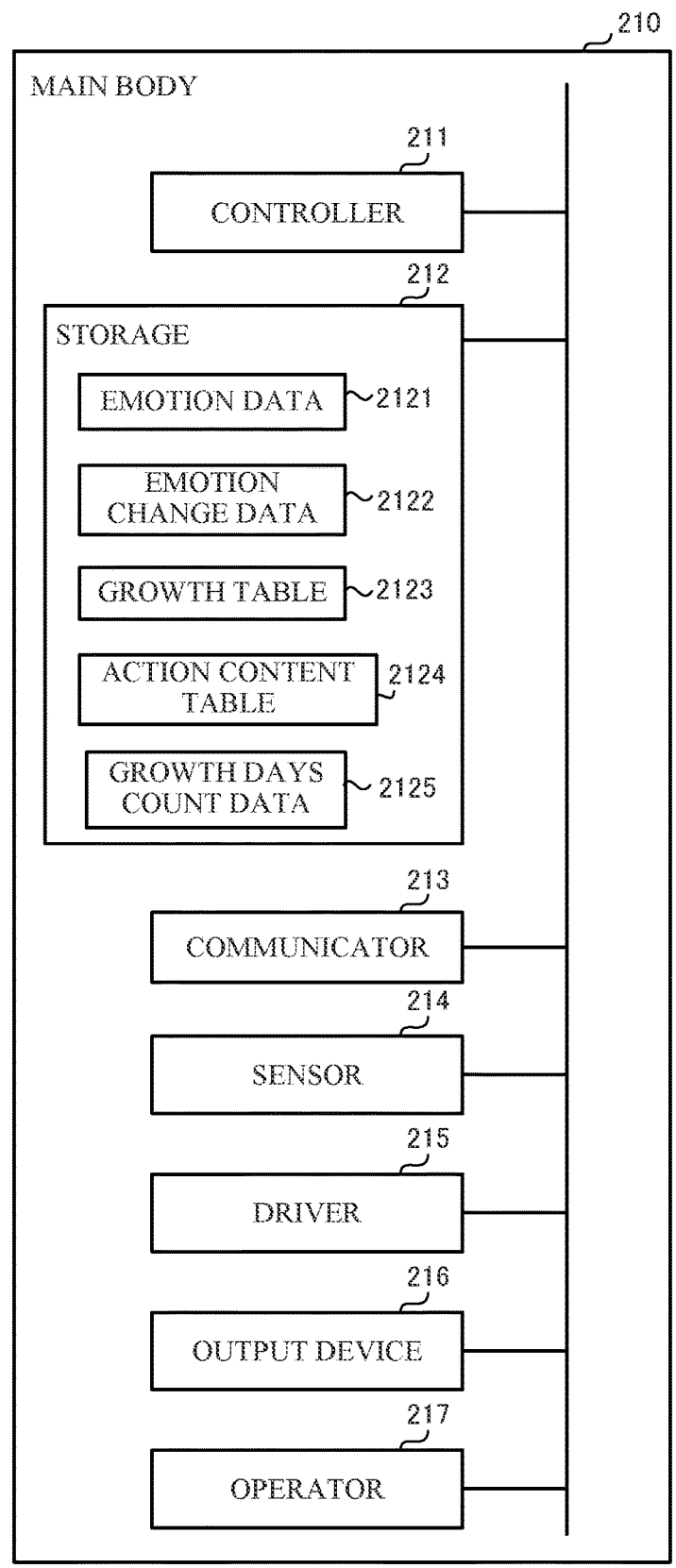
FIG. 5 is a block diagram illustrating the functional configuration of a main body of the robot according to the embodiment of the present disclosure.

Next, the functional configuration of the main body 210 of the robot 200 is described. As illustrated in FIG. 5, the main body 210 includes a controller 211, a storage 212, a communicator 213, a sensor 214, a driver 215, an output device 216, and an operator 217.

In one example, the controller 211 is configured from at least one central processing unit (CPU) or the like. The controller 211 executes various processes described below using programs stored in the storage 212.

The storage 212 is configured from read-only memory (ROM), flash memory, random access memory (RAM), or the like. Programs to be executed by the CPU of the controller 211, and data needed in advance to execute these programs are stored in the ROM. The flash memory is writable non-volatile memory, and stores data that is desired to be retained even after the power is turned OFF. Data that is created or modified during the execution of the programs is stored in the RAM. In one example, the storage 212 stores a speech buffer, a speech history, a touch history, emotion data 2121, emotion change data 2122, a growth table 2123, an action content table 2124, growth days count data 2125, and the like, all described hereinafter.

The communicator 213 includes a communication module compatible with a wireless local area network (LAN), Bluetooth (registered trademark), or the like, and carries out data communication with a smartphone or similar external device.

The sensor 214 includes the touch sensor 2141, the acceleration sensor 2142, the gyrosensor 2143, and the microphone 2144 described above. The controller 211 acquires, as external stimulus data, detection values detected by the various sensors of the sensor 214. The external stimulus data expresses an external stimulus acting on the robot 200.

The touch sensor 2141 detects contacting by some sort of object. In one example, the touch sensor 2141 is configured from a pressure sensor, a capacitance sensor, or the like. The controller 211 acquires a contact strength and/or a contact time on the basis of the detection values from the touch sensor 2141 and, on the basis of these values, can detect an external stimulus such as that the robot 200 is being pet or being struck by the user, and the like.

The acceleration sensor 2142 detects acceleration in three axial directions consisting of a forward-back direction, a width (left-right) direction, and a vertical direction of the torso 206 of the robot 200. The acceleration sensor 2142 detects gravitational acceleration when the robot 200 is stopped and, as such, the controller 211 can detect a current attitude of the robot 200 on the basis of the gravitational acceleration detected by the acceleration sensor 2142. Additionally, when, for example, the user picks up or throws the robot 200, the acceleration sensor 2142 detects, in addition to the gravitational acceleration, acceleration caused by the movement of the robot 200. Accordingly, the controller 211 can detect the movement of the robot 200 by removing the gravitational acceleration component from the detection value detected by the acceleration sensor 2142.

The gyrosensor 2143 detects angular velocity of the three axes of the robot 200. The controller 211 can determine a vibration state of the robot 200 on the basis of the maximum values of the angular velocities of the three axes.

In the present embodiment, in touch input processing described later, the controller 211 determines, on the basis of the gravitational acceleration detected by the acceleration sensor 2142, if the current attitude of the robot 200 is horizontal, upside down, upward facing, downward facing, or sideways facing.

The microphone 2144 detects ambient sound of the robot 200. The controller 211 can, for example, detect, on the basis of a component of the sound detected by the microphone 2144, that the user is speaking to the robot 200, that the user is clapping their hands, and the like.

The driver 215 includes the twist motor 2151 and the vertical motor 2152 as the movable parts that can move to express movement of the robot 200. The driver 215 is driven by the controller 211. The controller 211 controls the driver 215 and, as a result, the robot 200 can express actions such as, for example, lifting the head 204 up (rotating upward around the second rotational axis), twisting the head 204 sideways (twisting/rotating to the right or to the left around the first rotational axis), and the like. Additionally, the robot 200 can move by rotating the head 204 sideways while the head 204 is facing downward, for example. Action control data for performing these actions are stored in the storage 212, and the actions of the robot 200 are controlled on the basis of the detected external stimulus, a growth value described later, and the like.

The output device 216 includes the speaker 2161, and sound is output from the speaker 2161 as a result of sound data being input into the output device 216 by the controller 211. For example, the robot 200 emits a pseudo-animal sound as a result of the controller 211 inputting animal sound data of the robot 200 into the output device 216. This animal sound data is also stored in the storage 212, and an animal sound is selected on the basis of the detected external stimulus, a growth value described later, and the like. Note that the output device 216 constituted by the speaker 2161 is also called a sound output device.

In one example, the operator 217 is configured from an operation button, a volume knob, or the like. The operator 217 is an interface for receiving operations performed by the user (owner or borrower) such as, for example, turning the power ON/OFF, adjusting the volume of the output sound, and the like. Note that, a configuration is possible in which, in order to further enhance the sense of lifelikeness, the robot 200 includes only a power switch as the operator 217 on the inside of the exterior 201, and does not include other operation buttons, the volume knob, and the like. In such a case as well, operations such as adjusting the volume of the robot 200 can be performed using an external smartphone or the like connected via the communicator 213.

Next, of the data stored in the storage 212, the emotion data 2121, the emotion change data 2122, the growth table 2123, the action content table 2124, and the growth days count data 2125, which are pieces of data required to determine general actions determined on the basis of the growth value and the like, are described in order.

The emotion data 2121 is data for imparting pseudo emotions to the robot 200, and is data (X, Y) that represents coordinates on an emotion map. The emotion map is expressed by a two-dimensional coordinate system with a degree of relaxation (degree of worry) axis as the X axis, and a degree of excitement (degree of disinterest) axis as the Y axis.

The emotion change data 2122 is data that sets an amount of change that each of an X value and a Y value of the emotion data 2121 is increased or decreased. In the present embodiment, as emotion change data 2122 corresponding to the X of the emotion data 2121, DXP that increases the X value and DXM that decreases the X value are provided and, as emotion change data 2122 corresponding to the Y value of the emotion data 2121, DYP that increases the Y value and DYM that decreases the Y value are provided. Specifically, the emotion change data 2122 includes the following four variables, and is data expressing degrees to which the pseudo emotions of the robot 200 are changed.

DXP: Tendency to relax (tendency to change in the positive value direction of the X value on the emotion map)

DXM: Tendency to worry (tendency to change in the negative value direction of the X value on the emotion map)

DYP: Tendency to be excited (tendency to change in the positive value direction of the Y value on the emotion map)

DYM: Tendency to be disinterested (tendency to change in the negative value direction of the Y value on the emotion map)

In the present embodiment, the largest value among these four personality values is used as growth level data (growth value) that expresses a pseudo growth level of the robot 200. Moreover, the controller 211 controls so that variation is introduced into the action content of the robot 200 in accordance with the pseudo growth of the robot 200 (as the growth value increases). As such, the data used by the controller 211 is the growth table 2123.

Types of actions to be performed by the robot 200 in response to an action trigger such as the external stimulus detected by the sensor 214 or the like, and a probability of each action being selected in accordance with the growth value (hereinafter referred to as "action selection probability") are stored in the growth table 2123. Note that the action trigger is information about the external stimulus or the like that triggers the performance of some sort of action by the robot 200. The action selection probability is set such that, while the growth value is small, a basic action set in accordance with the action trigger is selected regardless of the personality values and, when the growth value increases, a personality action set in accordance with the personality values is selected. Additionally, the action selection probability is set such that the types of selectable basic actions increases as the growth value increases.

The action content table 2124 is a table in which specific action content of the various action types defined in the growth table 2123 are stored. However, for the personality actions, the action content is defined for every type of personality.

The growth days count data 2125 has an initial value of 1, and 1 is added for each passing day. The growth days count data 2125 represents a pseudo growth day count (number of days from a pseudo birth) of the robot 200.

Figure 6:
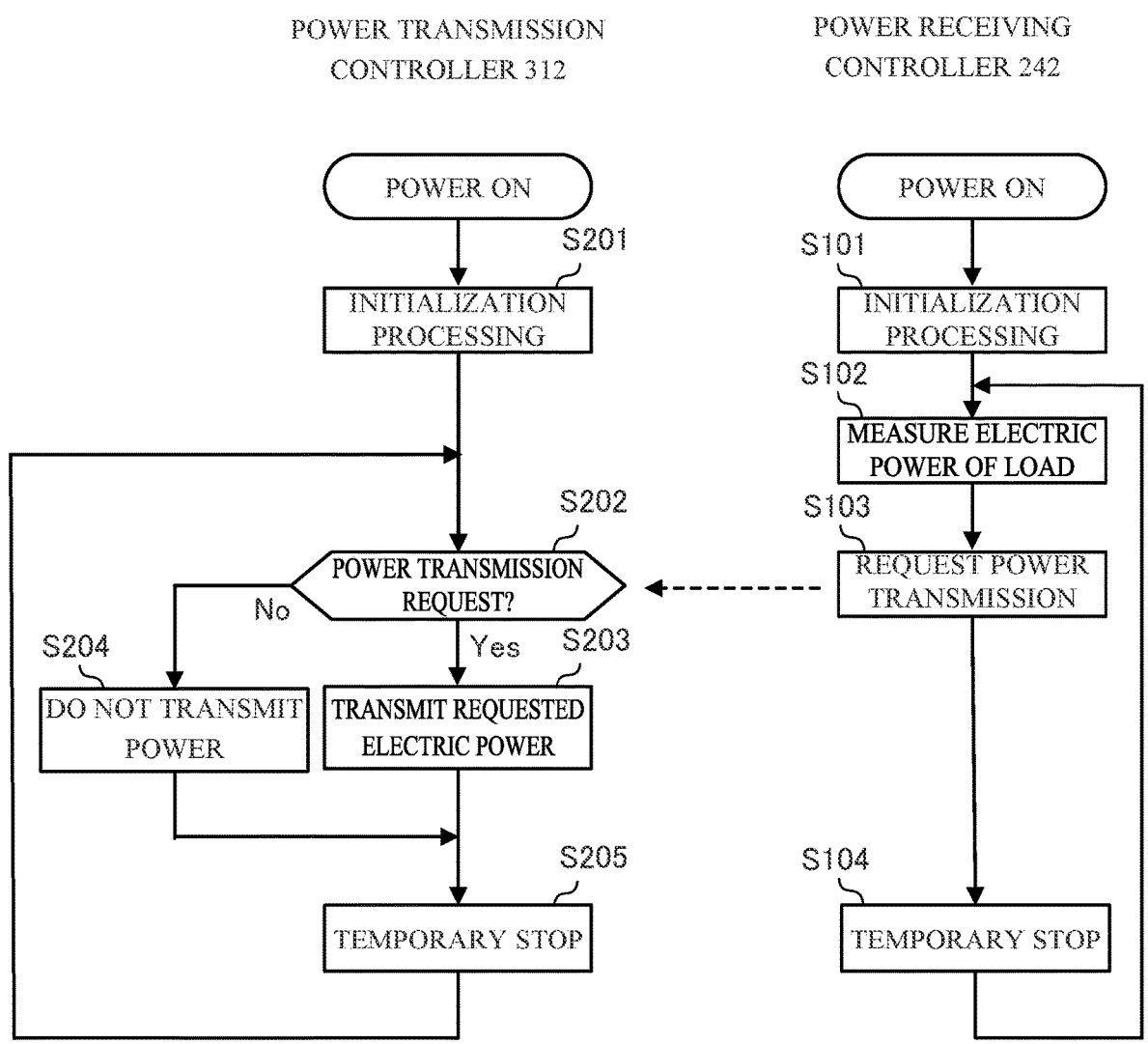
FIG. 6 is a flowchart of wireless power supply control processing according to the embodiment of the present disclosure.

Next, wireless power supply control processing executed by the power receiving controller 242 of the robot 200 and the power transmission controller 312 of the charging device 300 is described while referencing the flowchart illustrated in FIG. 6. The wireless power supply control processing is processing for controlling, in accordance with various types of loads of robot 200, the electric power that is transmitted. When the electric power transmitted in the wireless power supplying is always constant, unused electric power becomes heat, and heat is generated inside the robot 200. Accordingly, when the robot 200 is only performing the breathing action in a state in which the secondary battery 220 is fully charged, a portion of the transmitted electric power is not used and, as such, becomes heat, and the internal temperature rises. In particular, in the present embodiment, the housing 207 of the robot 200 is covered by the exterior 201 and, as such, heat is more likely to build-up therein and, as such, the interior of the exterior 201 may reach a high temperature and the actions of the robot 200 may be interfered with. As such, control is performed in which the minimum required electric power is transmitted from the charging device 300, and the received electric power is adjusted.

With the power receiving controller 242 of the robot 200, power receiving-side control processing of the wireless power supply control processing is started when the power of the robot 200 is turned ON. With the power transmission controller 312 of the charging device 300, power transmission-side control processing on the wireless power supply control processing is started when the AC adapter is connected to the household outlet and the power is turned ON. Firstly, the power receiving controller 242 performs initialization processing (step S101). Likewise, the power transmission controller 312 performs initialization processing (step S201).

Then, the power receiving controller 242 executes processing for measuring the electric power of the load (step S102). When the electric power of the load is measured, the power transmitter 310 is notified of that value (step S103). Meanwhile, the power transmission controller 312 determines whether there is a notification of a power transmission request from the power receiver 240 after the initialization processing (step S202). When the power transmission controller 312 determines that there is a notification of a power transmission request (step S202; Yes), the power transmission controller 312 transmits the requested electric power in accordance with the value of the electric power of the load for which notification is received (step S203). Meanwhile, when the power transmission controller 312 determines that there is not a notification of a power transmission request (step S202; No), the electric power is not transmitted (step S204). For example, when the robot 200 is not placed on the charging device 300, the required electric power value is not notified to the power transmission controller 312 and, as such, the power transmitter 310 does not transmit the electric power.

After executing power transmission request processing in step S103, the power receiving controller 242 ceases processing for a certain amount of time (step S104). After ceasing the processing for the certain amount of time, the power receiving controller 242 returns to step S102, executes the processing for measuring the electric power of the load again and, then executes the processing of steps S103 and S104, thereby repeating the processing of steps S102 to S104. After executing the power transmission processing of step S203 or the power non-transmission processing of step S204, the power transmission controller 312 ceases the processing for a certain amount of time (step S205). After ceasing the processing for the certain amount of time, the power transmission controller 312 returns to step S202, executes the processing of step S202 and the subsequent steps and, thereafter, repeats these processings. Thus, the determination processing for determining the amount of transmitted power is performed at regular intervals. However, power transmission itself is performed continuously.

As described above, in the wireless power supply control processing, the electric power to be transmitted is changed in accordance with the load and, as a result, the minimum power required is transmitted. Due to this, the amount of heat generation inside the robot can be suppressed and power consumption can be reduced. However, during charging, the charging current decreases when the secondary battery is close to a full charge and, as such, the electric power supplied from the power receiver 240 also decreases. When the load-side electric power fluctuates in this state, the received electric power is insufficient and the secondary battery discharges to compensate for the insufficient amount of electric power. This load fluctuation can be solved, by providing a capacitor on the output of the power receiver 240 to absorb the fluctuation. However, in a case in which the expected load fluctuation is large such as, for example, the case of the breathing action that causes the motors to operate, a high capacity capacitor is needed to absorb the load fluctuation. When the capacity of the capacitor is high, the size of the capacity increases a corresponding amount, and the cost increases. Accordingly, when using a relatively small size capacitor that can be easily accommodated in the robot 200, the capacity of the capacitor is limited. In this case, the load fluctuation is not sufficiently absorbed, and the secondary battery cannot reach a full charge. As such, in action control processing, during charging, when the secondary battery is close to a full charge, the breathing action that is a load fluctuation is limited. As a result, the load fluctuation decreases and can be absorbed by a smoothing capacitor having typical low capacity, and, as such, discharging of the secondary battery is eliminated and the full charge state can be maintained.

Figure 7:
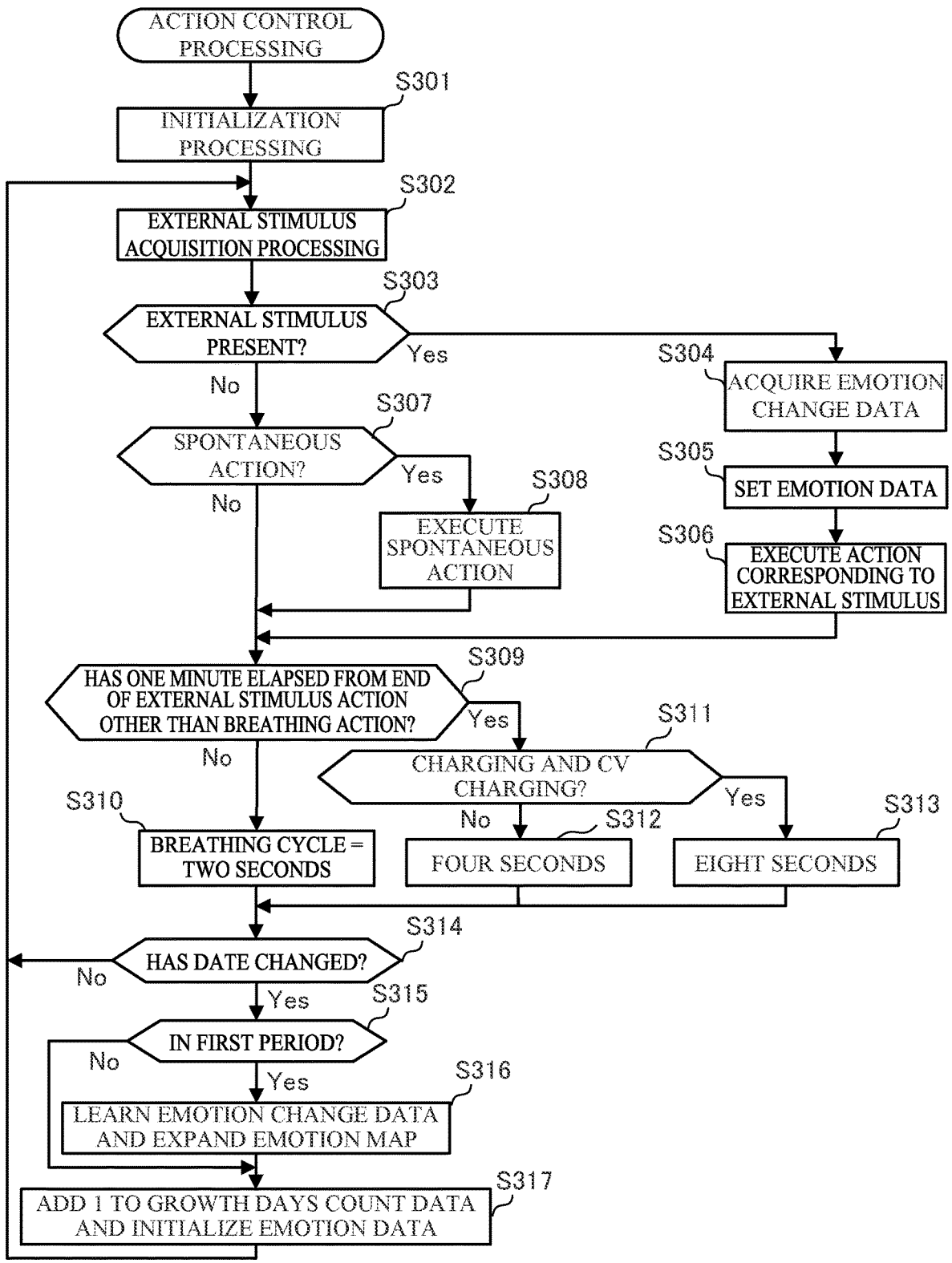
FIG. 7 is a flowchart of action control processing according to the embodiment of the present disclosure.

Next, action control processing executed by the controller 211 of the robot 200 is described while referencing the flowchart illustrated in FIG. 7. The action control processing is processing in which the controller 211 controls the actions (motion, animal sound, or the like) of the robot 200 on the basis of detection values from the sensor 214 or the like. When the user turns ON the power of the robot 200, execution of a thread of this action control processing is started in parallel with other required processings. As a result of the action control processing, the driver 215 and the output device 216 are controlled, the motion of the robot 200 is expressed, sounds such as animal sounds and the like are output, and the like.

Firstly, the controller 211 initializes the various types of data such as the emotion data 2121, the emotion change data 2122, the growth days count data 2125, and the like (step S301). Then, the controller 211 executes processing for acquiring the external stimulus from the various sensors of the sensor 214 (step S302). Next, the controller 211 determines whether there is an external stimulus detected by the sensor 214 (step S303).

When there is an external stimulus (step S303; Yes), the controller 211 acquires, in accordance with the external stimulus acquired by the various types of sensors, the emotion change data 2122 to be added to or subtracted from the emotion data 2121 (step S304). Specifically, when, for example, petting is detected by the three-axis acceleration sensor 2142 as the external stimulus, the robot 200 obtains a pseudo sense of relaxation and, as such, the controller 211 acquires DXP as the emotion change data 2122 to be added to the X value of the emotion data 2121. Moreover, the controller 211 sets the emotion data 2121 in accordance with the emotion change data 2122 acquired in step S304 (step S305). The controller 211 executes an action corresponding to the external stimulus (step S306), and then executes step S309.

Meanwhile, when there is not an external stimulus in step S303 (step S303; No), the controller 211 determines whether to perform a spontaneous action such as the breathing action or the like (step S307). Any method may be used as the method for determining whether to perform the spontaneous action but, in the present embodiment, for every breathing cycle, the determination of step S307 is Yes and the breathing action is performed.

The breathing action is an action in which the twist motor 2151 and the vertical motor 2152 are driven to periodically provide movement to a portion, corresponding to the back of the robot, of the exterior 201 to give the appearance of breathing. Furthermore, a breathing sound may be emitted from the speaker 2161. This spontaneous action is performed when an external stimulus is not present and, as such, greater lifelikeness can be expressed and the user can be made to feel attachment to the robot.

When the spontaneous action is to be performed (step S307; Yes), the controller 211 executes the spontaneous action, namely the breathing action (step S308), and then executes step S309.

In step S309, the controller 211 determines whether a predetermined amount of time such as, for example, one minute, has elapsed since the end of an external stimulus-based action other than the breathing action. Here, the reason one minute is used is because lifelike movement is expressed by shortening the breathing cycle for one minute after the end of the external stimulus action and, furthermore, if only intermittent breathing action is executed for one minute after the end of the external stimulus action, the amount of electric power needed for the actions of the main body 210 decreases and a determination can be made that the electric power to be supplied from the charging device 300 to the power receiver 240 has become somewhat less. Thus, determining that one minute has elapsed since the end of the external stimulus action corresponds to an electric power estimator that estimates the electric power to be supplied to the charging controller 230. In this case, the electric power that the main body 210 needs other than when executing the breathing action is substantially zero. As such, a determination can be made that the electric power estimated by the electric power estimator is less than the electric power needed for the breathing action.

In the present embodiment, the electric power to be supplied to the charging controller 230 is estimated by the passage of time, but a configuration is possible in which the electric power that the power receiver 240 supplies to the charging controller 230 is directly measured. In such a case, an extremely small resistor is inserted on the power supply line leading from the power receiver 240 to the charging controller 230, and the electric power can be estimated by observing the voltage drop. In a case in which the power receiving control microcomputer, namely the power receiving controller 242, has a function for notifying about the electric power that the power receiving controller 242 supplies, that function may be used.

When a determination is made that one minute has not elapsed since the end of the external stimulus action (step S309; No), the controller 211 sets the breathing cycle shortly, that is, to two seconds (step S310).

Meanwhile, when a determination is made in step S309 that one minute has elapsed since the end of the external stimulus action (step S309; Yes), the controller 211 acquires the charge state of the secondary battery 220, and determines whether the robot 200 is being charged and the charging method is switched from the CC charging to the CV charging (step S311).

When the robot 200 is not placed on the charging device 300 and is not being charged, or is being charged and, while being charged to a certain degree, the charge state is still insufficient, and the charging method is not switched from the CC charging to the CV charging (step S311; No), the controller 211 sets the breathing cycle to four seconds (step S312). In step S311, the acquiring of the charge state for determining the charge state corresponds to a charge state acquirer that acquires the charge state for a case in which the charging controller 230 charges the secondary battery 220.

Meanwhile, when the robot 200 is placed on the charging device 300 and is being charged and, also, the charging method is switched from the CC charging to the CV charging and the charge state of the secondary battery 220 is a state close to being fully charged (step S311; Yes), the controller 211 sets the breathing cycle to eight seconds (step S313). In the state close to being fully charged, the charging current is small, and the electric power supplied from the power receiver is small. The reason the breathing cycle is set to eight seconds instead of to four seconds is because, when the breathing cycle is four seconds, the smoothing capacitor 243 discharges due to the load fluctuation caused by the breathing action, and the four seconds is not sufficient as an amount of charging time for the smoothing capacitor 243 to be charged again and return to the original state after discharging. In such a case, the load fluctuation cannot be absorbed by the smoothing capacitor 243, and the electric power is supplied to the main body 210 from the secondary battery 220. Accordingly, when the breathing cycle is left as-is at four seconds, the secondary battery 220 is repeatedly fully charged and discharged. By setting the breathing cycle to eight seconds, even when there is load fluctuation caused by the breathing, time for the smoothing capacitor 243 to recharge can be secured and the load fluctuation can be absorbed using a small capacity smoothing capacitor. As such, discharging of the secondary battery 220 can be suppressed and the fully charged state can be maintained. Thus, setting the breathing cycle longer and limiting the breathing action corresponds to the action controller that controls so as to limit a predetermined action.

When the breathing cycle is set in step S310, S312, or S313, the controller 211 uses a clock function to determine whether the date has changed (step S314). When the date has not changed (step S314; No), the controller 211 executes step S302.

When the date has changed (step S314; Yes), the controller 211 determines whether it is in a first period (step S315). When the first period is, for example, a period 50 days from the pseudo birth (for example, the first startup by the user after purchase) of the robot 200, the controller 211 determines that it is in the first period when the growth days count data 2125 is 50 or less. When it is not in the first period (step S315; No), the controller 211 executes step S317. When it is in the first period (step S315; Yes), the controller 211 performs learning of the emotion change data 2122, and expands the emotion map (step S316). Then, the controller 211 adds 1 to the growth days count data 2125, initializes both the X value and the Y value of the emotion data to 0 (step S317), and returns to step S302.

In the embodiment described above, the secondary battery 220 is maintained in the fully charged state by lengthening the breathing cycle of the breathing action that is a spontaneous action of the robot 200. However, provided that the load is changed such that the fully charged state is maintained, a different mode may be used. For example, a configuration is possible in which the motors, which have high power consumption, are not driven in the breathing action and, instead, a breathing action is executed in which only a breathing sound, which has comparatively low power consumption, is emitted. In such a case, the load fluctuation caused by the breathing action is small and, as such, even if the cycle of the breathing action is set to four seconds, the load fluctuation can be absorbed by the smoothing capacitor 243.

A configuration is possible in which the robot 200 includes a light emitter. For example, a light emitter such as a light emitting diode (LED) or the like may be provided on a back side of the torso 206 on the inside of the exterior 201, and the breathing action may be expressed by slowing lighting and extinguishing the LED. The LED has lower power consumption compared to motor driving and, as such, when the secondary battery 220 is in the state close to being fully charged, the breathing sound and the lighting of the LED alone can be set as the breathing action, without driving the motors.

The spontaneous action is not limited to the breathing action, and other actions may be used. For example, an action of causing the body to shudder, or an action resembling stretching may be used as the spontaneous action.

Additionally, the control device is not limited to a control device of a robot, and may be a control device that controls another electronic device. For example, the control device can control such that, when a clock in which a doll rotates at a certain time to notify the time is charging, when the clock is close to being fully charged, the doll does not rotate and the time is notified by only sound and light. Additionally, a configuration is possible in which a time interval of the time notification that causes the doll to rotate is made longer than normal.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A control device comprising:
   a storage; and
   a hardware processor which, under control of a program stored in the storage, executes processes comprising:
   controlling (i) an electric power supply to an operating part, and (ii) charging and discharging of a secondary battery;
   estimating an amount of electric power being supplied to each of the operating part and the secondary battery;
   acquiring a charge state of the secondary battery; and
   in response to determining that (i) the amount of electric power estimated in the estimating is less than an amount of electric power required for a predetermined action to be executed by the operating part, and (ii) the charge state of the secondary battery acquired in the acquiring is a predetermined charge state, controlling so as to limit the predetermined action.

2. The control device according to claim 1, wherein:
   the predetermined action is an intermittent action executed intermittently by the operating part, and
   the processor controls to limit the intermittent action by making an interval of the intermittent action greater than an interval of the intermittent action when the charge state of the secondary battery is not the predetermined charge state.

3. The control device according to claim 2, wherein:
   the control device is provided in a robot including the operating part,
   the control device controls operation of the robot, and
   the predetermined action is a breathing action.

4. The control device according to claim 2, wherein:
   the predetermined action includes an action of driving a motor, and
   the processor controls to limit the predetermined action by controlling so as not to perform the action of driving the motor.

5. The control device according to claim 2, wherein the processor estimates the amount of electric power based on an elapsed time from an end of an action other than the predetermined action.

6. The control device according to claim 1, wherein:
   the control device is provided in a robot including the operating part,
   the control device controls operation of the robot, and
   the predetermined action is a breathing action.

7. The control device according to claim 6, wherein:
   the predetermined action includes an action of driving a motor, and
   the processor controls to limit the predetermined action by controlling so as not to perform the action of driving the motor.

8. The control device according to claim 6, wherein the processor estimates the amount of electric power based on an elapsed time from an end of an action other than the predetermined action.

9. The control device according to claim 1, wherein:
   the predetermined action includes an action of driving a motor, and
   the processor controls to limit the predetermined action by controlling so as not to perform the action of driving the motor.

10. The control device according to claim 9, wherein the processor estimates the amount of electric power based on an elapsed time from an end of an action other than the predetermined action.

11. The control device according to claim 1, wherein the processor estimates the amount of electric power based on an elapsed time from an end of an action other than the predetermined action.

12. The control device according to claim 1, wherein a charging method of the secondary battery is a CCCV method, and the predetermined charge state is a state of being charged by constant voltage.

13. The control device according to claim 1, wherein the predetermined charge state is a state in which charge current is less than or equal to a predetermined value.

14. A control method comprising:
   controlling (i) an electric power supply to an operating part, and (ii) charging and discharging of a secondary battery;
   estimating an amount of electric power being supplied to each of the operating part and the secondary battery;
   acquiring a charge state of the secondary battery; and in response to determining that (i) the amount of electric power estimated in the estimating is less than an amount of electric power required for a predetermined action to be executed by the operating part, and (ii) the charge state of the secondary battery acquired in the acquiring is a predetermined charge state, controlling so as to limit the predetermined action.

15. A non-transitory computer-readable recording medium storing a program for causing a computer to execute processes comprising:

controlling (i) an electric power supply to an operating part, and (ii) charging and discharging of a secondary battery;

estimating an amount of electric power being supplied to each of the operating part and the secondary battery;

acquiring a charge state of the secondary battery; and in response to determining that (i) the amount of electric power estimated in the estimating is less than an amount of electric power required for a predetermined action to be executed by the operating part, and (ii) the charge state of the secondary battery acquired in the acquiring is a predetermined charge state, controlling so as to limit the predetermined action.

\* \* \* \* \*